Nov. 25, 1969          P. F. HAYNER ET AL          3,479,925
HYDRAULIC SIGNAL SUMMING AND CONTROL SYSTEM
Filed March 7, 1967                          2 Sheets-Sheet 1
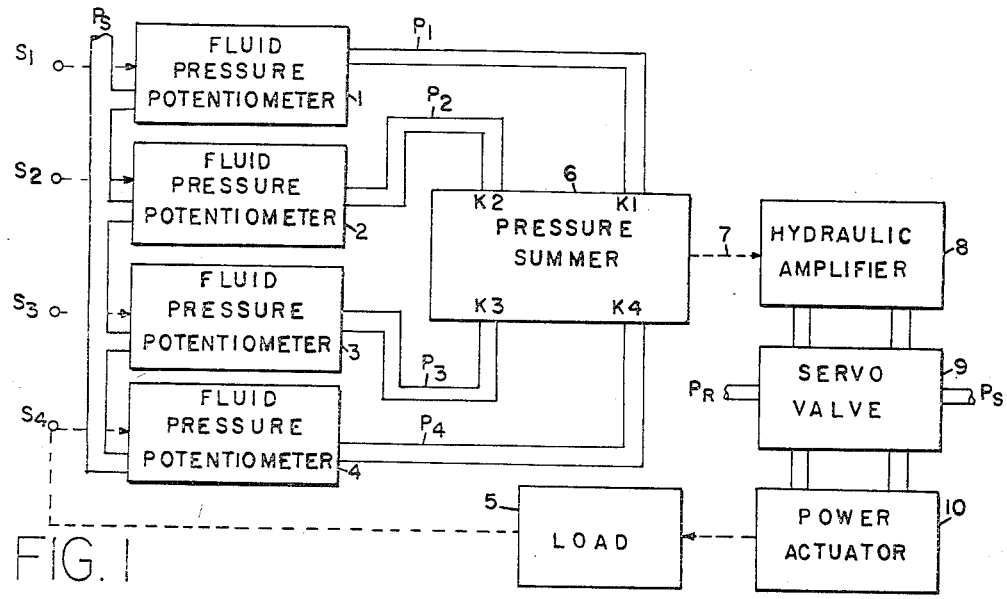
FIG. 1
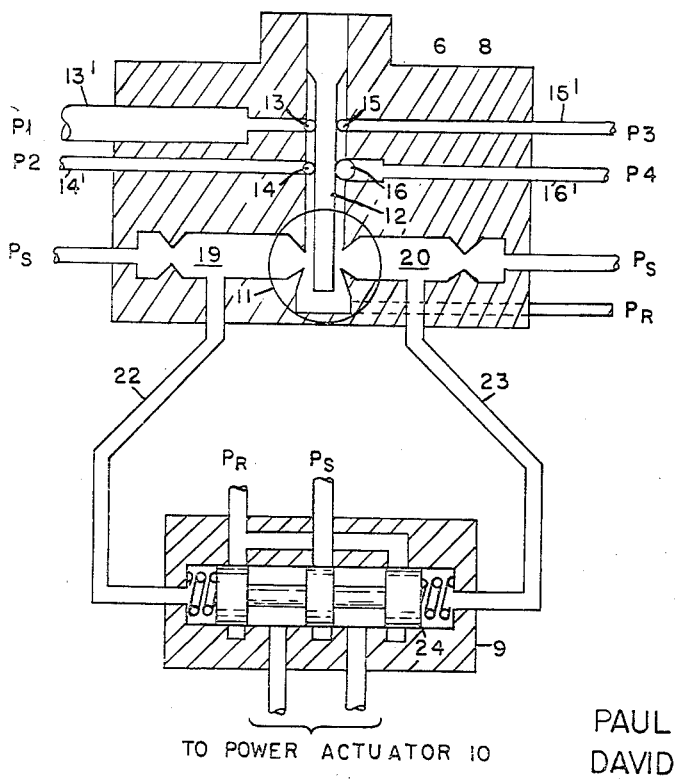
FIG. 2
INVENTORS
PAUL F. HAYNER
DAVID G. ELDRIDGE
BY 
ATTORNEY

INVENTORS
PAUL F. HAYNER
DAVID G. ELDRIDGE

ATTORNEY

United States Patent Office 3,479,925
Patented Nov. 25, 1969

3,479,925
HYDRAULIC SIGNAL SUMMING AND
CONTROL SYSTEM
Paul F. Hayner, Lexington, Mass., and David G. Eldridge,
Nashua, N.H., assignors to Sanders Associates, Inc.,
Nashua, N.H., a corporation of Delaware
Filed Mar. 7, 1967, Ser. No. 621,219
Int. Cl. F15b 13/16, 11/10, 13/042
U.S. Cl. 91—367         9 Claims

ABSTRACT OF THE DISCLOSURE

This is a hydraulic or pneumatic control system for controlling fluid pressure and flow to an actuator so that the actuator position is controlled in accordance with a predetermined function of a plurality of fluid pressure signals. The fluid pressure signals are converted to mechanical forces which are applied to resilient mechanical structure which directly controls fluid flow from two or more nozzles producing a pressure differential representative of the predetermined function. This pressure differential is employed to meter the fluid pressure and/or flow to the actuator.

---

This invention relates to hydraulic control systems and more particularly to a proportional control system which responds to a plurality of control signals.

Heretofore, mechanical parameters such as position, altitude, velocity, acceleration, etc. have served as the inputs to hydraulic proportional control systems. These inputs are usually represented by electric signals, because the transducers which detect the parameters produce electric signals and these electric signals are employed directly to control parts of the hydraulic system. Systems of this sort are referred to as electro-hydraulic systems. For example, an electro-hydraulic servo valve operates in conjunction with an electro-magnetic torque motor to convert an electric control signal into a hydraulic pressure which in turn operates hydraulic actuators to accomplish a control action. Obviously, such systems require electric power as well as hydraulic power for operation. Furthermore, the dynamic responses of the torque motor and the hydraulic servo valve must be matched and this is often difficult and leads to complicated and expensive equipment.

It is one object of the present invention to provide such a hydraulic control system in which some of the above named disadvantages of prior systems are avoided.

It is another object of the present invention to provide a control system which responds to a plurality of control signals and combines them hydraulically to provide hydraulic actuating forces.

It is another object of the present invention to provide a reliable, simple, relatively inexpensive hydraulic control system in which most or all of the electric and electronic equipment normally used in such systems is eliminated.

An embodiment of the present invention provides hydraulic proportional control of a number of input parameters. These parameters may be represented by electrical signals or mechanical actuations and are converted to equivalent fluid pressures. The equivalent pressures are combined in a mechanical summing device which includes a two, four or more nozzle flapper valve. The flapper valve combines the fluid pressures in accordance with a predetermined relationship. The flapper valve is mechanically displaced a distance which represents the desired response of the system to the input signals and actuations. The flapper displacement, denoted X, is concerted to an amplified fluid pressure which controls a hydraulic power actuator for displacing a load. One of the fluid pressures applied to the flapper is responsive to the movement of the load and provides negative feedback to the systems so that stable proportional control is achieved.

Other objects and features of the present invention will be apparent from the following specific description taken in conjunction with the figures in which:

FIGURE 1 is a block diagram illustrating the principal parts of a hydraulic system incorporating features of the present invention;

FIGURE 2 is a sectional view showing the flapper valve which combines the hydraulic pressures representing input parameters and feedback and the hydraulic means for amplifying the result and controlling a hydraulic power actuator in response thereto;

Figure 4:
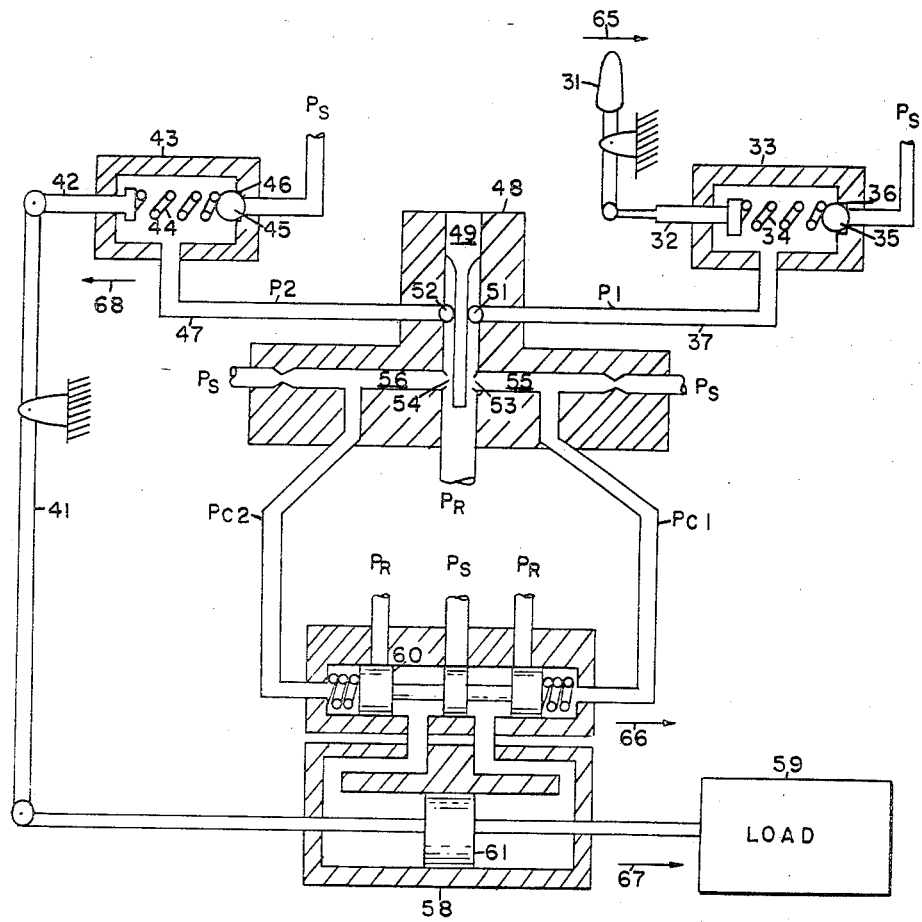
FIGURE 4 is a partially sectioned diagram of a proportional system for controlling the actuation of a load and which includes features of the present invention.

Turning first to FIGURE 1 there is shown a block diagram of the principal functioning parts of an embodiment of the present invention, whereby a number of input signals denoted $S_1$, $S_2$ and $S_3$ are combined in a predetermined way along with a feedback signal, denoted $S_4$, to displace a load. All actuations in the system shown in FIGURE 1 are hydraulic or mechanical or a combination of hydraulic and mechanical, and this includes the structure for combining fluid pressure signals $P_1$, $P_2$, $P_3$ and $P_4$ which are representative of the signals $S_1$, $S_2$, $S_3$ and $S_4$, respectively. Accordingly, no electrical apparatus is employed in the system shown in FIGURE 1 and all actuations are administered mechanically or by hydraulically operated valve devices which control the flow rate and pressure of fluid in the system.

The three external input signals $S_1$, $S_2$ and $S_3$ are applied to fluid pressure potentiometers 1, 2 and 3, each of which serves to convert the input signal directed to it into an equivalent fluid pressure which is preferably directly proportional to the magnitude of the signal. The fourth $S_4$ is a feedback signal and is converted to pressure $P_4$ by fluid pressure potentiometer 4 and may be obtained, for example, from the load 5. Fluid pressures $P_1$, $P_2$, $P_3$ and $P_4$ are combined in a predetermined manner in the pressure summer 6. In the pressure summer, each of the four pressures $P_1$ to $P_4$ are biased by gain or biasing factors $K_1$ to $K_4$, respectively, and combined to produce a mechanical displacement in the output 7 from the summer which is representative of the combined pressures. This mechanical displacement, denoted herein as X, is converted and amplified as a hydraulic pressure by hydraulic amplifier 8 and fed to the servo valve 9 which controls hydraulic power actuator 10 which drives the load 5 for a useful purpose.

All fluid pressures in the systems described are derived from a source of constant pressure denoted $P_s$ and all fluid flow is returned to this source at a lower pressure $P_r$.

The pressure summer 6 includes a mechanical summing mechanism which is mechanically displaced in accordance with a prescribed relationship between the fluid pressures $P_1$ to $P_4$ applied to the pressure summer. This mechanical displacement, denoted X, is normally very small; however, it is sufficient to produce a pressure differential in amplifier 8 which is relatively large. Accordingly, the pressures $P_1$ to $P_4$ are mechanically combined to produce a small mechanical displacement X which is amplified substantially in the hydraulic amplifier, producing a fluid pressure differential proportional to the displacement and of relatively large magnitude. This differential may be of substantially larger magnitude than can be produced by the input pressures $P_1$ to $P_4$ combined in the prescribed manner.

A simple mechanism for combining the pressures $P_1$ to $P_4$ which provides for adding and subtracting two or more pressures so that the pressures can be combined in a great variety of different manners is illustrated in FIGURE 2. This includes a so-called flapper valve 11 comprising an elongated resilient flapper vane 12 which is fixed at one end and free to flex at the other end. The free end is mechanically deflected by forces delivered to each side of the flapper vane which are proportional to the pressures $P_1$ and $P_4$. These forces are applied by, for example, balls 13 to 16 which are held firmly against the vane by the pressures $P_1$ and $P_4$, in conduits 13' to 16', respectively. The diameters of these balls 13 thru 16 represent the gain factors $K_1$ to $K_4$, respectively, and so the greater the diameter of the ball, the greater will be the gain factor.

The free end of the flapper 12 is displaced depending upon the diameters of the balls 13 to 16 and the magnitude of the pressures $P_1$ to $P_4$. Other factors influencing the displacement of the free end of the flapper are the lever arm at which the force is exerted by each ball on the flapper and the flexibility of the flapper. The lever arms extending to some of the balls are different from the lever arms extended to others. The difference, however, may be compensated for by the diameter of the ball and so to be exact, the ball diameter and lever arm together with flapper flexibility determine the gain factors $K$.

The translational displacement of the free end of the flapper vane, denoted $X$, is relatively small. This displacement or flapper position $X$ can be established in accordance with any of the following relationships as well as many others:

$$X = K_1 P_1 - K_3 P_3$$
$$X = K_1 P_1 \quad K_2 P_2$$
$$X = K_1 P_1 \quad K_2 P_2 - K_3 P_3$$
$$X = K_1 P_1 \quad K_2 P_2 - K_3 P_3 - K_4 P_3$$
$$X = K_1 (P_1 - P_3) \quad K_2 (P_2 - P_4)$$
$$X = P_1 (K_1 \quad K_2) - P_3 (K_3 \quad K_4)$$

where $P_1 = P_2$, $P_3 = P_4$.

Figure 3:
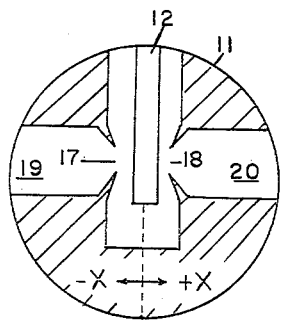
FIGURE 3 illustrates by enlargement a portion of the double nozzle flapper valve.

Regardless of the relationship by which the flapper displacement $X$ is established, the flapper vane displacement will control the flow of fluid from the supply through orifices 17 and 18 (see FIG. 3) which are spaced on opposing sides and close to the free end of the flapper vane. The flow through these orifices determines the pressure in the associated chambers 19 and 20. For example, when the flapper vane is displaced $X$ toward orifice 18, the pressure in chamber 20 will increase and the pressure in chamber 19 will decrease, and the differential pressure between chambers 19 and 20 will be quite significant even for small displacement of the flapper.

The servo valve 9 may be, for example, a zero lapped spring centered four way spool type valve of conventional type. It controls hydraulic fluid flow from the supply at pressure $P_s$ to the power actuator 10 and the flow of fluid from the actuator back to a return at pressure $P_r$. The servo valve 9 is controlled by the differential pressure between chambers 19 and 20 representing the displacement $X$ of the flapper vane. For this purpose, conduits 22 and 23 connect fluid pressure from chambers 19 and 20, respectively, to opposite sides of the spring centered spool 24 in valve 9. Thus, the servo valve 9 will feed hydraulic fluid at the pressure $P_s$ to the power actuator 10 so long as the flapper vane is displaced either to the right ( $X$) or the left ($-X$). When the flapper vane displacement is zero, resulting in zero pressure differential, the flow of hydraulic fluid to the power actuator will stop and the system will be static. Thereafter, should any of the input signals $S_1$ to $S_3$ change, the system will again become dynamic, because the flapper vane 12 will be displaced and the power actuator will drive the load until a new load position corresponding to the change in the inputs, is achieved. As this occurs, the feedback represented by pressure $P_4$ will be sufficient to return the flapper vane 12 to its zero position, and the system once again will be static at a new load position corresponding to the change in the input conditions. Thus, proportional control is achieved.

As mentioned above, the flapper valve, including the flapper 12 and the nozzles 17 and 18, functions as an adder to combine the pressures $P_1$ to $P_4$ in a prescribed manner converting these pressures into an equivalent flapper vane displacement $X$. The displacement $X$ is converted by the flapper valve into an equivalent pressure differential which may be substantially greater magnitude than the combined pressures $P_1$ to $P_4$. The differential pressure between chambers 19 and 20 is sufficient to directly drive the servo valve 9.

FIGURE 4 is a sectional view showing the mechanical and hydraulic parts in a hydraulic proportional control system having a single input. Here the input pressure is denoted $P_1$ and the feedback pressure is denoted $P_2$. The input pressure $P_1$ is proportional to the input actuation which is a mechanical actuation, delivered by a lever 31 to a piston 32 in the fluid potentiometer 33. Within the potentiometer 33 the piston loads a spring 34 which holds a ball 35 against an orifice 36 that meters fluid at supply pressure $P_s$ into the line 37 at the input pressure $P_1$. Thus, the mechanical actuation of the lever 31 is converted to the input pressure $P_1$.

Similarly, the feedback actuation delivered by feedback mechanism 41 to the piston 42 in feedback fluid potentiometer 43 loads the spring 44 therein which holds the ball 45 against orifice 46 to meter fluid at supply pressure $P_s$ into the line 47 at the feedback pressure $P_2$.

The input pressure $P_1$ and feedback pressure $P_2$ are combined and amplified in the double nozzle flapper valve 48 which includes a flapper vane 49 having one end fixed and the other free to flex. The free end is deflected by the force exerted against it by balls 51 and 52 at the ends of lines 37 and 47, respectively, and which are subjected to the pressures $P_1$ and $P_2$, respectively.

The input pressure $P_1$ and feedback pressure $P_2$ are compared by the flapper which is displaced an amount $X$ proportional to the difference between $P_1$ and $P_2$ ($P_1 - P_2$). The free end of the flapper is deflected by the net force exerted against it by the balls 51 and 52 at the ends of the lines 37 and 47, respectively, which are subjected to the pressures $P_1$ and $P_2$, respectively. The free end of the flapper vane controls the flow from the nozzles or orifices 53 and 54, thereby producing control pressures $PC_1$ and $PC_2$ in chambers 55 and 56, respectively. The differential pressure $PC_1 - PC_2$ is applied to the ends of the power control spool 60 which meters hydraulic fluid at supply pressure $P_s$ to one side or the other of the ram piston 61 of the power actuator 58, depending upon whether $PC_1$ or $PC_2$ is the greater. Fluid from the other side of the ram piston is returned to the return pressure $P_r$ by way of the power control spool 60.

The flapper vane in FIGURE 4 performs the simple computation $X = K_1 P_1 - K_2 P_2$, where $X$ is the displacement of the free end of the flapper vane 49, $K_1$ and $K_2$ are the gain factors on each of the pressures $P_1$ and $P_2$, as determined by the size of the ball that each pressure acts against, the lever arm of the action and the flexibility of the vane 49. This displacement is converted to the pressure differential $PC_1 - PC_2$ as described above which is used to displace the power control spool.

In operation, when the lever 31 is moved in the direction of arrow 65, $P_1$ will increase, $PC_1$ will decrease and the spool 60 in power actuator 58 will move in the direction of arrow 66. This will allow hydraulic fluid at supply pressure $P_s$ to flow into the chamber on one side of the ram piston 61 driving the load 59 in the direction of arrow 67. This moves the piston 42 in the direction of arrow 68 causing an increase in the feedback pressure $P_2$ and so the free end of the flapper 49 is driven back to its zero displacement position. At this position $PC_1 = PC_2$ and the system once again becomes static with the input lever and load at a new position.

This completes description of a number of embodiments of the present invention for combining one or more input signals in an all mechanical and fluid actuator system to achieve proportional control of a load, and while substantial detail of various parts of embodiments described herein is included this is not intended to limit the spirit and scope of the invention as set forth in the accompanying claims in which:

What is claimed is:

1. A control system for administering a power actuation in response to at least one mechanical input control signal wherein the improvement comprises:
   first fluid pressure potentiometer means for converting said control signal into a first fluid pressure proportional thereto in a first conduit,
   second fluid pressure potentiometer means for converting said power actuation into a second fluid pressure proportional thereto in a second conduit,
   an elongated resilient member fixed at one end and relatively free to move in at least one dimension at the other end and acted upon by said first and second fluid pressures to produce a displacement of said other end proportional to the algebraic sum of said first and second fluid pressures,
   means responsive to said displacement for producing a fluid force in accordance therewith,
   a power actuator, and
   means responsive to said fluid force for controlling said power actuator.

2. A control system as in claim 1 and in which,
   said means for producing a fluid force includes at least two additional fluid conduits the pressure differential between which constitutes said fluid force,
   said free end of said resilient body being disposed to intercept fluid flow from said additional conduits so that a change in the displacement of said free end produces a change in said fluid force.

3. A control system as in claim 2, and in which,
   said first and second pressures apply forces to said elongated member along said member between the free end and the fixed end thereof.

4. A control system as in claim 3 and in which,
   said first and second pressures each act against movable members of predetermined cross-sectional area in direct contact with said elongated resilient member,
   so that the force exerted by each of said movable members of predetermined cross-sectional area upon said elongated resilient member is directly proportional to the associated pressure applied to the movable member and the cross-sectional area thereof.

5. A control system as in claim 4 and in which,
   said forces on said elongated resilient member derived from said first and second pressures combine to determine the displacement of the free end of said resilient member.

6. A control system as in claim 5 and in which,
   said forces are exerted on said elongated resilient member at different distances from the fixed end thereof.

7. A control system as in claim 5 and in which,
   the predetermined cross-sectional areas of said movable members are different.

8. A control system as in claim 5 and in which,
   the predetermined cross-sectional areas of said movable members are different and are at different distances from the relatively free end of said elongated resilient member,
   whereby the effect of each of said first and second pressures upon the displacement of said free end of said resilient member is a function of said pressure, said cross-sectional area and said distance.

9. A control system for administering a power actuation in response to a multitude of mechanical input control signals wherein the improvement comprises,
   means for converting each of said input control signals into a representative fluid pressure proportional thereto,
   means for converting said power actuation into a representative feedback fluid pressure proportional thereto,
   an elongated resilient member relatively fixed at one end and free at the other end to be displaced laterally,
   at least one pair of fluid orifices adjacent said free end for directing fluid flow against said free end,
   means for conducting fluid from a source to said orifices, whereby fluid flow through said orifices varies as said free end is laterally displaced,
   a plurality of movable members each bearing on a side of said elongated resilient member and each having a predetermined cross-sectional area exposed to a different one of said pressures so that each exerts a lateral deflecting force on said free end,
   the locations at which said movable members bear on said resilient member being selected so that the lateral displacement of said free end of said resilient member is substantially directly proportional to a predetermined function of said input control signals,
   means for administering said power actuation to a load, and
   means responsive to the pressure of fluid at said orifices for controlling said actuating means.

References Cited

UNITED STATES PATENTS

| 2,886,010 | 5/1959 | Hayos et al. | 91—385 |
|---|---|---|---|
| 3,386,343 | 6/1968 | Gray | 91—388 |
| 2,785,659 | 3/1957 | Reip | 91—3 |
| 2,989,950 | 6/1961 | Lockman | 91—388 |
| 3,171,329 | 3/1965 | Rasmussen | 91—388 |
| 3,282,283 | 11/1966 | Takeda | 91—3 |
| 3,283,669 | 11/1966 | Lissau | 91—388 |

FOREIGN PATENTS 721,373   6/1942   Germany.

PAUL E. MASLOUSKY, Primary Examiner

U.S. Cl. X.R.

91—385, 388, 461